Dec. 9, 1941.   C. M. HAMBLIN   2,265,160
VIBRATION DAMPENING FITTING
Filed Aug. 6, 1940
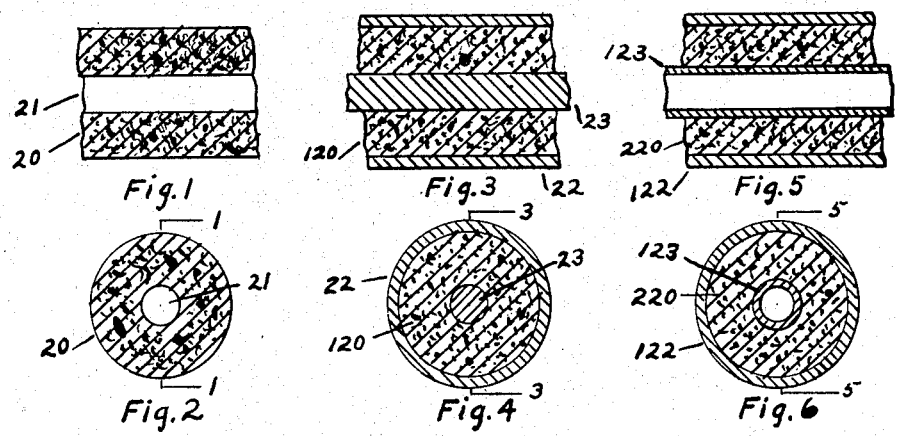
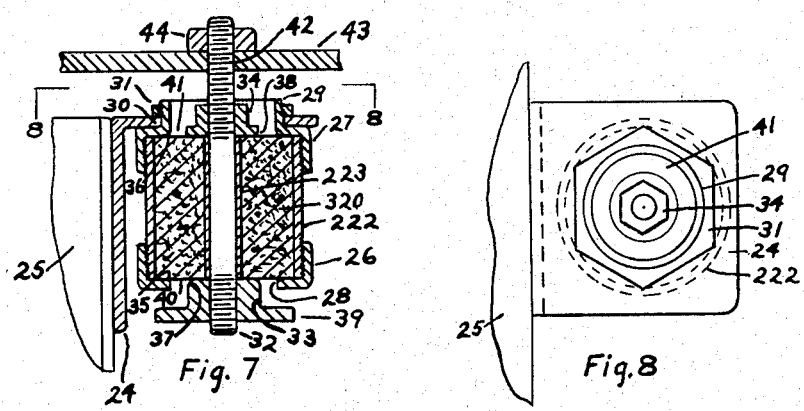
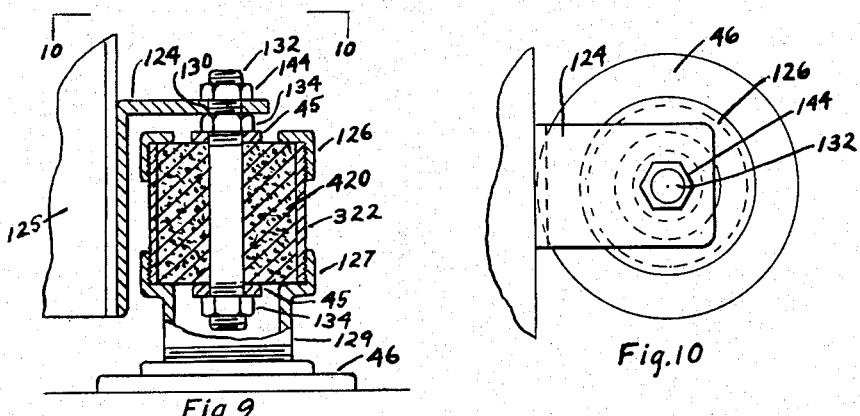
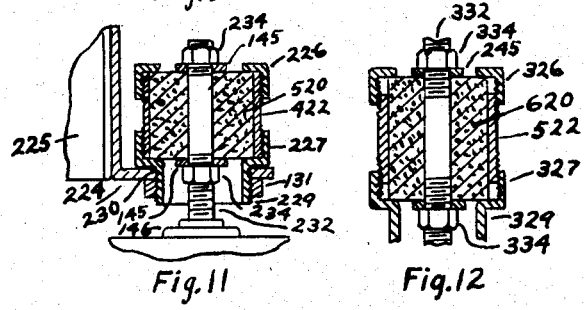
INVENTOR
CLYDE M. HAMBLIN.
BY
ATTORNEY Patented Dec. 9, 1941

2,265,160

UNITED STATES PATENT OFFICE 2,265,160

VIBRATION DAMPENING FITTING

Clyde M. Hamblin, Washington, D. C.

Application August 6, 1940, Serial No. 351,637

2 Claims. (Cl. 248—358)

(Granted under the act of March 3, 1883, as amended April 30, 1928; 370 O. G. 757)

This invention relates to improvements in the design of vibration dampening fittings.

It is a principal object of this invention to provide means of supporting a load by a tubular member of elastic material, such as rubber, in shear between an outer tubular member and an inner tubular, cylindrical or regular polyhedral member.

A further object is to provide an elastic material such as rubber in tubular form with tubular outer casing and tubular, cylindrical or regular polyhedral central insert in considerable lengths from which sections of desired length may be cut to make up vibration dampening fittings having the required vibration dampening characteristics.

Another object is to provide means of making up any selected length of the tubular elastic material together with its inner and outer members with standardized end fittings to form a complete vibration dampening fitting.

In accomplishing these and other objects, there are provided the improved details of construction, the preferred forms on which are illustrated in the accompanying drawing, wherein Fig. 1 is a longitudinal sectional view of a portion of a tube of elastic material, taken on line 1—1 of Fig. 2;

Fig. 2 is a transverse sectional view of the tube shown in longitudinal section by Fig. 1;

Fig. 3 is a longitudinal sectional view of a portion of a tube of elastic material with tubular metal outer casing and solid metal central insert taken on line 3—3 of Fig. 4;

Fig. 4 is a transverse sectional view of the tube shown in longitudinal section by Fig. 3;

Fig. 5 is a longitudinal sectional view of a portion of a tube of elastic material with tubular metal outer casing and tubular metal central insert taken on line 5—5 of Fig. 6;

Fig. 6 is a transverse sectional view of the tube shown in longitudinal section by Fig. 5;

Fig. 7 is a sectional view in elevation of a vibration dampening fitting arranged for suspending a load from overhead;

Fig. 8 is a plan view of the fitting shown in Fig. 7, taken on line 8—8;

Fig. 9 is a sectional view in elevation of a vibration dampening fitting arranged for supporting a load from below with point of attachment to the load above the vibration dampening element;

Fig. 10 is a plan view of the vibration dampening fitting shown in Fig. 9 taken on line 10—10;

Fig. 11 is a sectional view in elevation of a vibration dampening fitting arranged for supporting a load from below with point of attachment to the load below the vibration dampening element; and Fig. 12 is a sectional view in elevation of a vibration dampening fitting wherein the elastic material is cut to a longer length than the enclosing tube.

There is shown at 20 in Figs. 1 and 2, a section of tubing of elastic material, such as rubber, with hollow core 21.

In Figs. 3 and 4, the elastic tube is molded in or inserted in an outer tube or pipe 22, preferably metallic tube or pipe of standard commercial size. A solid core 23, preferably metal bolt material of commercial standard size, is molded or inserted centrally of the elastic tube. The solid core 23 may have a smooth surface or may be threaded its entire length with standard threads. The elastic tube 120 may be bonded to the outer tube 22 by cementing or vulcanizing or may be a close fit without bond. The solid core 23 may likewise be bonded to the interior of the elastic tube 120 by cementing or vulcanizing or may be a close fit without bond.

In Figs. 5 and 6, the elastic tube 220 is molded in or inserted in an outer tube 122 as described for Figs. 3 and 4. A tube or pipe core 123 is substituted in Figs. 5 and 6 for the solid core 23 shown in Figs. 3 and 4.

The elastic tube with its outer metal tube and inner metal core may be of any length convenient for manufacture but is preferably of commercial pipe or tube length. The elastic material and the treatment or cure thereof must be such as to give proper vibration dampening characteristics. The load bearing and vibration dampening characteristics of the elastic material are dependent upon the treatment or cure of the material, the transverse sectional area of the material and the longitudinal length of the material. As one of the features of this invention is the ability to cut the tubular elastic material to anay desired increment of length, the number of different treatments or cures of the elastic material and the number of different sizes of transverse sectional area of the elastic material may be relatively few, since a large variation in loading can be accommodated with a given quality and transverse sectional size of elastic material by selection of the proper length of elastic material.

In the view of an assembled vibration dampening fitting shown in Fig. 7, the elastic tube

320 with its outer metal tube 222 and inner metal tube 223 is cut to desired length. The outer metal tube 222 is threaded on the ends and threaded retainers 26 and 27 are screwed hard up against the ends of tube 222 and elastic tube 320. Retainer 26 has a hole concentric with the axis of the elastic tube and retainer 27 has a threaded tubular elongation 29 of reduced size, concentric with the axis of the elastic tube and projecting through a hole 30 in bracket 24. The vibration dampening fitting is secured in place in bracket 24 by means of nut 31 screwed on the threaded elongation 29 of retainer 27. Hole 30 in bracket 24 may be threaded to fit threads on elongation 29 for additional security, if desired. Threaded stud 32 is inserted in inner tube 223 and threaded nuts 33 and 34 are screwed hard up against the ends of inner tube 223 and elastic tube 320. Edges 35 and 36 of retainers 26 and 27 and edges 37 and 38 of nuts 33 and 34 are rounded in way of the elastic material to prevent cutting the surface of the elastic material when it is deflected by the load. Where the load is suspended from overhead, as in Fig. 7, a portion 39 of nut 33 is extended radially to engage with the lower end of retainer 26 in case of failure of the elastic material 320 which might cause the load to fall.

The radial width of space 40 between retainer 26 and nut 33 and space 41 between retainer 27 and nut 34 is made suitable to permit the necessary deflection of the elastic material in shear due to the load and to give the desired vibration dampening characteristics. The upper end of threaded stud 32 is inserted through hole 42 in structural member 43, from which the load 25 is supported, and secured by nut 44. The hole 42 may be threaded to fit stud 32 for additional security.

In Figs. 9 and 10 a vibration dampening fitting generally similar to the fitting shown in Fig. 7 is arranged for supporting the load from below such as on a floor or deck. In this view the point of support of the load is on the top of the vibration dampening fitting. For descriptive purposes the type of elastic material, exterior tube and solid core construction shown in Figs. 3 and 4 are used in Figs. 9 and 10, but the construction shown in Figs. 5 and 6 and used in Figs. 7 and 8 is equally suitable. In Fig. 9 standard nuts 134 and washers 45 are substituted for special nuts 33 and 34 shown in Fig. 7. The elongation 129 of retainer 127 is screwed into floor flange 46 to support the entire assembly. The load 125 is supported by bracket 124 on central stud 132 which is threaded through hole 130 in bracket 124 and is secured by nut 144.

The vibration dampening fitting shown in Fig. 11 is generally similar to those shown in Figs. 7 and 8, but is arranged for supporting load 225 from below as on a floor or deck and has the vibration dampening element above the point of attachment to bracket 224 instead of below, as in Fig. 9. In this arrangement elongation 229 of retainer 227 is threaded through hole 230 in bracket 224 from above and is secured by nut 131. The assembly is supported on the floor or deck by stud 232 which is screwed into floor flange 146. This arrangement has the advantage that the elastic elements of the vibration dampening fittings at different points of support for a given load such as a fan, pump or other machine may be of different lengths to suit unequal loads at the respective points without affecting the level of the machine.

Fig. 2 shows a vibration dampening element generally similar to those shown in Figs. 7, 9 and 11, except that the elastic tube 620 is cut longer than the outer tube 522 and inner tube 123, if fitted, to permit modifying the vibration dampening characteristics of the elastic material by compressing the material by means of threaded retainers 326 and 327 and nuts 334.

Other modifications and changes in the proportions and arrangements of the parts may be made by those skilled in the art without departing from the nature of the invention within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. A vibration dampening fitting comprising a selected length of elastic material of uniform tubular shape, a rigid tubular outer casing, a rigid inner concentric core, the opposite ends of said casing and of said core being externally threaded, said core threads extending to within said length of tubular elastic material to frictionally retain said elastic material thereon, threaded nuts cooperating with said threaded core, threaded retainer caps cooperating with said threaded casing, said caps having internally extending flanges holding said elastic material within the ends of said casing, and a supporting means for said fitting comprising a concentric tubular elongation extending from one of said cap flanges.

2. A vibration dampening fitting comprising a selected length of elastic material of uniform tubular shape, a rigid tubular outer casing, a rigid inner concentric core, the opposite ends of said casing and of said core being externally threaded, said core threads extending to within said length of tubular elastic material to frictionally retain said elastic material thereon, threaded nuts cooperating with said threaded core, threaded retainer caps cooperating with said threaded casing, said caps having internally extending flanges holding said elastic material within the ends of said casing, a supporting means for said fitting comprising a concentric tubular elongation extending from one of said cap flanges, and a load assuming support in case of failure of said elastic material comprising a radial flange on the outer end of said nut at the opposite end from said tubular elongation, said radial flange being of greater diameter than the diameter of the opening in the flange of said adjacent cap.

CLYDE M. HAMBLIN.